Figure 1:
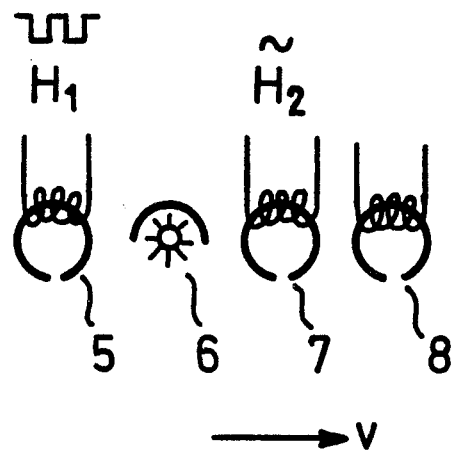

United States Patent [19]

Koester et al.

[11] 4,438,462

[45] Mar. 20, 1984

[54] DOCUMENT IDENTIFICATION EMPLOYING EXCHANGE-ANISOTROPIC MAGNETIC MATERIAL

[75] Inventors: Eberhard Koester, Frankenthal; Joachim Hack, Ludwigshafen; Manfred Steuerwald, Frankenthal, all of Fed. Rep. of Germany

[73] Assignee: BASF Aktiengesellschaft, Ludwigshafen, Fed. Rep. of Germany

[21] Appl. No.: 212,629

[22] Filed: Dec. 3, 1980

[30] Foreign Application Priority Data

Dec. 13, 1979 [DE] Fed. Rep. of Germany ....... 2950129

[51] Int. Cl.³ .......................................... G11B 25/04
[52] U.S. Cl. ......................................... 360/2; 235/493
[58] Field of Search ................ 235/450, 493; 360/59, 360/55, 2

[56] References Cited

U.S. PATENT DOCUMENTS

| | | |
|---|---|---|
| 2,988,466 | 6/1961 | Meiklejohn . |
| 3,219,353 | 11/1965 | Prentky . |
| 3,328,195 | 6/1967 | May . |
| 3,566,356 | 2/1971 | Holm et al. . |
| 3,599,153 | 8/1971 | Lewis et al. . |
| 3,883,892 | 5/1975 | Kneller . |
| 3,946,206 | 3/1976 | Darjany ................................. 360/2 |
| 3,959,032 | 5/1976 | Koester et al. . |
| 3,961,990 | 6/1976 | Koester et al. . |

FOREIGN PATENT DOCUMENTS

| | | |
|---|---|---|
| 2405623 | 1/1976 | Fed. Rep. of Germany . |
| 1127043 | 9/1968 | United Kingdom . |
| 1331604 | 9/1973 | United Kingdom . |

*Primary Examiner*—Vincent P. Canney
*Attorney, Agent, or Firm*—Keil & Witherspoon

[57] ABSTRACT

A process for authenticating recording media which are to be safeguarded against falsification and which possess a layer of exchange-anisotropic magnetic material, by determining the residual recording which is left over, because of the exchange anisotropy of the magnetic material, from a recording of a sequence of signals after exposure of the material to a specific temperature cycle and, subsequently, to a magnetic AC field which decreases to zero, and an apparatus for carrying out the said process.

4 Claims, 2 Drawing Figures

U.S. Patent    Mar. 20, 1984    4,438,462

DOCUMENT IDENTIFICATION EMPLOYING EXCHANGE-ANISOTROPIC MAGNETIC MATERIAL

This invention relates to a process for authenticating recording media which are to be safeguarded against falsification and which possess a layer of exchange-anisotropic magnetic material, by determining the residual recording which is left over, because of the exchange anisotropy of the magnetic material, from a recording of a sequence of signals after exposure of the material to a specific temperature cycle and, subsequently, to a magnetic AC field which decreases to zero, and to an apparatus for carrying out the said process.

A plurality of materials and processes for authenticating documents of various kinds, such as check cards, identity cards, banknotes and the like, or of magnetic recording media, has been proposed. Special magnetic or magnetizable materials may be employed for this purpose, either as such or in certain specific arrangements.

For example, British Pat. No. 1,127,043 discloses the incorporation of threads consisting of, or comprising, ferromagnetic material into security papers for banknotes or checks, in the actual course of manufacture of the paper. The magnetic properties of this material serve to subsequently identify the security paper. U.S. Pat. No. 3,599,153 proposes to prevent falsification in a different manner, namely by applying a mark or image consisting of magnetic ink to the document concerned, by the intaglio process, since, after saturation of the magnetic material in a constant magnetic field, a signal which varies proportionally to the varying thickness of the magnetic ink can be detected. To safeguard documents in the form of magnetic recording media, British Pat. No. 1,331,604 proposes orienting acicular magnetic particles, in selected spaced zones of a layer of such particles, fixedly in a predetermined direction, whilst the particles in the remainder of the layer are either not oriented or are oriented in a direction substantially at right angles to the first-mentioned direction. Such an arrangement is nowadays referred to as a magnetic watermark. In contrast, U.S. Pat. No. 3,566,356 discloses a security document bearing a magnetic recording, the document possessing one or more layers of a mixture of magnetizable materials having special hysteresis characteristics. The authenticity of the document is checked by comparing the sequence of recorded signals on exposure of the document to a demagnetizing field with a predetermined sequence of signals which depend on the hysteresis characteristics of the mixture of magnetic materials. Provisional data can be recorded magnetically in the material by using conventional processes. However, in such a document it is necessary to use special combinations of magnetizable materials, as has been described.

U.S. Pat. Nos. 3,219,353 and 3,328,195 disclose other multi-layer magnetic recording media which respond to different frequency ranges or in which easily erased short-term information can be recorded in one layer whilst information which is difficult to erase is recorded in the other layer. Such media can be used for security documents; their authenticity can be checked by ascertaining the presence of a predetermined information pattern, for example a code pattern, which is recorded in the layer intended for the information which is difficult to erase. However, here again the document can be falsified, using conventional recording processes, by erasing or modifying such a recorded information code pattern.

In addition to the shortcomings already described, all these processes have the further disadvantage that the ferromagnetic or ferrimagnetic materials used, even the cobalt/rare earth compounds of extremely high coercive force, are easily obtainable or have appropriate replacements. Given this situation, the desired effect, namely the safeguarding of such documents against falsification, cannot be achieved with absolute certainty.

For this reason it has also already been proposed (U.S. Pat. No. 3,883,892) to produce magnetic recording tapes employing exchange-anisotropic material which are virtually impossible to falsify.

An exchange-anisotropic magnetic material consists of a thin ferromagnetic or ferrimagnetic film to which an anti-ferromagnetic film has been applied, or consists of small ferromagnetic or ferrimagnetic particles which are coated with a thin layer of an anti-ferromagnetic material. The ferromagnetic or ferrimagnetic order vanishes above the Curie temperature $T_c$ and the anti-ferromagnetic order above the Neel temperature $T_N$. If $T_c > T_N$, the exchange-anisotropic magnetic material remembers the direction of the adjacent spins of the ferromagnetic or ferrimagnetic component if it is heated to $T_N < T_2 < T_c$, and is then again cooled to a lower temperature, for example to room temperature $T_1 < T_N < T_c$. Frequently, $T_2$ can even be slightly below $T_N$. It is true that in this case the ferromagnetic or ferrimagnetic component of the material can, at $T_1$, be magnetized any number of times in different directions by means of a strong magnetic field, but if it is exposed to an AC field which gradually decreases from high field strengths to zero, it is not demagnetized to zero, like a normal magnetic material; instead, depending on the nature of exchange-anisotropic material used, a high proportion of the original magnetization, in its original direction, is retained.

Accordingly, falsification of recordings on recording media of this type are only feasible if the magnetic material is heated to a temperature of the order of magnitude of the Neel temperature. However, to indicate that such heating has taken place, irreversible thermo-indicators are additionally required. Even though these exchange-anisotropic magnetic materials are extremely difficult to obtain, because of the special manufacturing techniques required, and even though their properties cannot be reproduced identically without an exact knowledge of the particular process employed, the above process for the safeguarding of documents against falsification still has the disadvantage that the magnetic materials concerned do not have very good recording properties and the available thermo-indicators are not fully satisfactory.

It is an object of the present invention to provide a process for safeguarding recording media against falsification which avoids the above disadvantages and enables, as a result of the use of magnetic materials which are difficult to obtain and to reproduce, the authenticity of the recording media to be checked, without there being any need to employ additional auxiliaries, such as indicators or other magnetic materials.

We have found that this object is achieved by a process for authenticating recording media which are to be safeguarded against falsification and which possess a layer of exchange-anisotropic magnetic material whose Neel temperature $T_N$ is lower than the Curie temperature $T_c$ of the ferromagnetic or ferrimagnetic component, if this layer of the recording medium is successively (a) recorded with a sequence of signals,
(b) heated to a temperature $T_2$ which is below $T_c$ and above $T_{AFS}$,
(c) cooled to a temperature $T_1$ which is below $T_2$, and
(d) exposed to a magnetic AC field which decreases to zero and whose strength is at least four times as great as the coercive force of the magnetic material present, and if subsequently
(e) the residual magnetic recording is determined and compared with the sequence of signals recorded under (a).

In a special embodiment of the novel process, after steps (a) to (e) have been carried out, they are repeated using another sequence of signals, preferably a sequence of signals which is the reverse of the first sequence of signals.

The apparatus according to the invention for effecting authentication comprises an arrangement of conventional means which enable the individual process steps listed above to be carried out.

Figure 2:
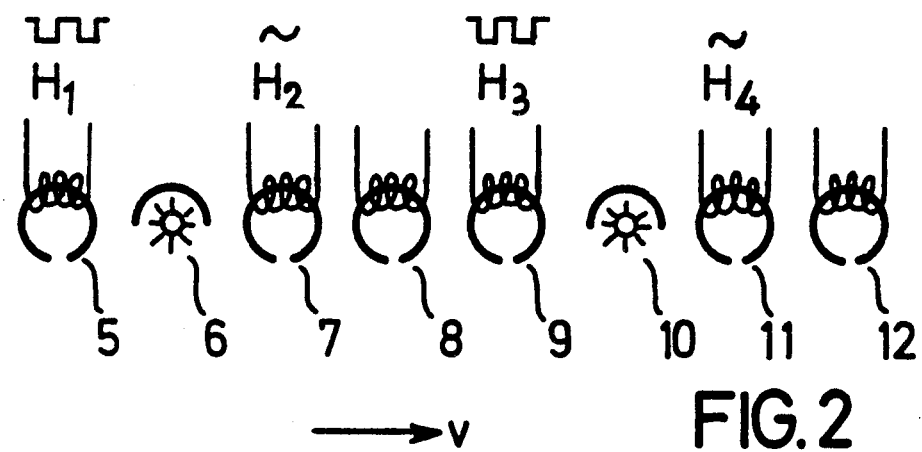

Illustrative embodiments, given by way of example, are shown in the drawings, in which FIG. 1 is a diagrammatic representation of apparatus for carrying out the process according to the invention, using one sequence of signals; and FIG. 2 is a diagrammatic representation of apparatus for carrying out the process according to the invention, using two sequences of signals.

Using the process and apparatus according to the invention, it is possible to clearly detect the presence of an exchange-anisotropic magnetic material and hence to achieve greater protection of documents against falsification than is possible when using conventional magnetic materials.

The layer of exchange-anisotropic material is produced in a conventional manner. For example, a number of appropriate magnetic materials has been disclosed, the materials being either particulate (U.S. Pat. Nos. 2,988,466; 3,959,032; and 3,961,990) or in the form of uniform films (German Laid-Open Application DOS No. 2,405,623). The latter can be applied directly to the document to be safeguarded against falsification. However, this method is probably rarely applicable, since the process includes conditions which are not suitable for all substrates. Hence, it is advisable to employ the exchange-anisotropic material in particulate form and convert it, in a conventional manner, into inks, pastes or self-supporting tapes or sheets. For this purpose, the conventional techniques for producing magnetic printing inks or recording media may be employed.

A document provided with a layer of exchange-anisotropic magnetic material is then guided, at constant speed, in the direction marked v in FIG. 1, past the authenticating apparatus comprising individual stations 5 to 8, a sequence of signals, e.g. a sequence of rectangular pulses, being recorded in the layer of exchange-anisotropic material with the aid of a magnetic head 5 having a field strength $H_1$. Thereafter, the material is heated, under the heat source 6, to a temperature $T_2$. $T_2$ must be below the Curie temperature $T_c$ of the magnetic material and above $T_{AFS}$, $T_{AFS}$ being below the Neel temperature $T_N$ and equal to or above the temperature at which the anti-ferromagnetic axis is irreversibly rotated by the existing remanent magnetization, i.e. without the action of an external magnetic field. Preferably, $T_2$, in this process step, is equal to or only slightly below $T_N$. After this heating step, the regions of exchange-anisotropic material cool to a temperature $T_1$, which is below $T_{AFS}$, usually to room temperature. This heat treatment aligns the direction of magnetization of the anti-ferromagnetic component of the magnetic material with that of the ferromagnetic or ferrimagnetic component. If, in the next step of authentication according to the invention, an AC field, of strength $H_2$, which is generated by the magnetic head 7 and slowly decreases to zero, acts on the regions of exchange-anisotropic material, a signal U can be detected by the magnetic head 8, since, in the case of AC field demagnetization, a large proportion of the original magnetization of the original sequence of signals is left, the proportion depending on the nature of the exchange-anisotropic material.

In the preferred embodiment of the novel process, authentication is effected by means of the apparatus shown by way of example in FIG. 2. At stations 5 to 8 the procedure described above is followed. Thereafter, a new sequence of signals, which is preferably the reverse of the sequence of signals recorded with magnetic head 5, is recorded with magnetic head 9 having a field strength $H_3$. As a result, the ferromagnetic or ferrimagnetic component, which has beforehand been demagnetized by the decreasing AC field $H_2$, is now remagnetized. After subsequently heating the material to a temperature $T_2$, by means of a heat source 10 which is of the same type as heat source 6, and thereafter cooling the material, the anti-ferromagnetic component of the material is oriented in the same direction as the ferromagnetic or ferrimagnetic component, so that after demagnetization under the magnetic head 11, by means of an AC field $H_4$ which decreases to zero, there again remains the proportion of magnetization produced by the exchange-anisotropic material. This proportion is then determined by means of the read head 12.

In carrying out the process according to the invention, the strength of the magnetic fields $H_1$ to $H_4$ is not very critical, as long as $H_2$ is greater than $H_1$ and $H_4$ is greater than $H_3$. Preferably, the strengths of fields $H_1$ and $H_3$ are of equal magnitude and correspond to about three times the coercive force $H_{CA}$ of the exchange-anisotropic magnetic material, whilst the strengths of fields $H_2$ and $H_4$, which are also of equal magnitude, are about four times the coercive force. The fields $H_1$ and $H_3$ can be produced by conventional magnetic heads or by other arrangements such as permanent magnets or solenoids.

The heat sources 6 and 10 may be radiant heaters or heated rollers or plates. However, it is important that the magnetic material should reach the product temperature $T_2$. Furthermore, it may be advantageous, in carrying out the process according to the invention, to cool the magnetic material, by contact with appropriate rollers or plates, upstream of each of the stations 7 and 11, so as to reach the temperature $T_1$ more rapidly.

Using the process and apparatus according to the invention, the presence of a magnetic exchange-anisotropic material can be clearly detected, and by setting the special parameters, i.e. the temperatures and the strengths of the magnetic fields, the specific material used can be identified with absolute certainty. The additional application of a code, for example in the form of a special pattern of the regions of magnetic material, or in the form of additional markings, may be advantageous but is not of prime importance in the process according to the invention.

The Examples which follow illustrate the invention. Example 2 shows, in comparison with Example 1 according to the invention, that the use of a conventional ferromagnetic or ferrimagnetic material, having a coercive force which is less than or equal to that of the exchange-anisotropic material and for which the authenticating apparatus is designed, produces no signal, and Example 3 shows that the use of a material of very high coercive force but without an anti-ferromagnetic phase gives no signal or, if a signal is already present, a false read signal which does not match the recorded signal.

EXAMPLE 1

An exchange-anisotropic magnetic material, consisting of small particles possessing a core of an alloy of 65% of Co and 35% of Ni and a surface oxide layer of 65% of CoO and 35% of NiO, is dispersed in a solution of a binder based on a partially hydrolyzed vinyl chloride/vinyl acetate copolymer, and the dispersion is applied to a polyester film and dried. The tape obtained has a remanence $M_R$ of 0.13 T, a coercive force $H_{CA}$ of 31 kA/m and a Neel temperature $T_N$ of 100° C. Before further testing, the tape is demagnetized with an AC field at 110° C.

The resulting tape is then passed, at a speed of 50 mm/sec, through an apparatus according to FIG. 2. The strength of field $H_1$ produced by magnetic head 5 is 100 kA/m, $T_2$ is 110° C. and the AC field $H_2$ has, at a frequency of 60 kHz, a strength of 120 kA/m. The fields $H_3$ and $H_4$ correspond to the fields $H_1$ and $H_2$, but the sequence of rectangular pulses recorded with magnetic head 9 is the reverse of the sequence of rectangular pulses recorded with magnetic head 5. The amplitudes of the remaining signals are determined via the magnetic heads 8 and 12, and compared with the recorded signals. The results are given in the Table.

EXAMPLE 2

Instead of an exchange-anisotropic material, a Co-modified iron oxide powder is used to produce a tape which has a coercive force $H_c$ of 30 kA/m. Further testing is carried out as described in Example 1. The results are given in the Table.

EXAMPLE 3

Instead of an exchange-anisotropic material, a barium ferrite powder is used to produce a tape which has a coercive force $H_c$ of 350 kA/m. This tape is tested as described in Example 1, the barium ferrite material having been previously demagnetized. The results are given in the Table.

TABLE

|  | Example 1 | Example 2 | Example 3 |
|---|---|---|---|
| Coercive force | $H_{CA}$ | $H_{CA}$ | $H_{CA}$ |
| Observed properties | Read signal (Si) | Read signal (Si) | Read signal (Si) |
| Initial value | O | O or Si | O |
| Writing with head 5 Heating to 110° C. and demagnetization with head 7 | Si (+) | Si (+) | O |
| Reading with head 8 | 0.25 Si (+) | O | O |
| Writing with head 9 Heating to 110° C. and demagnetization with head 11 | Si (−) | Si (−) | O |
| Reading with head 12 | 0.25 Si (−) | O | O |

We claim:

1. A process for authenticating recording media which are to be safeguarded against falsification and which possess a layer of exchange-anisotropic magnetic material whose Neel temperature $T_N$ is lower than the Curie temperature $T_c$ of the ferromagnetic or ferrimagnetic component, wherein this layer of the recording medium is successively
   (a) recorded with a sequence of signals,
   (b) heated to a temperature $T_2$ which is below $T_c$ and above $T_{AFS}$,
   (c) cooled to a temperature $T_1$ which is below $T_2$, and
   (d) exposed to a magnetic AC field which decreases to zero and whose strength is at least four times as great as the coercive force of the magnetic material present, and subsequently
   (e) the residual magnetic recording is determined and compared with the sequence of signals recorded under (a).

2. A process for authenticating recording media which are to be safeguarded against falsification and which possess a layer of exchange-anisotropic magnetic material whose Neel temperature $T_N$ is lower than the Curie temperature $T_c$ of the ferromagnetic or ferrimagnetic component, wherein this layer of the recording medium is successively
   (a) recorded with a sequence of signals,
   (b) heated to a temperature $T_2$ which is below $T_c$ and above $T_{AFS}$,
   (c) cooled to a temperature $T_1$ which is below $T_2$, and
   (d) exposed to a magnetic AC field which decreases to zero and whose strength is at least four times as great as the coercive force of the magnetic material present, and subsequently
   (e) the residual magnetic recording is determined and compared with the sequence of signals recorded under (a), and then steps (a) to (e) are repeated using another sequence of signals.

3. Apparatus for carrying out the authentication process as claimed in claim 1, which comprises a successive arrangement of
   (a) means for producing a magnetic recording,
   (b) means for heating a magnetic material passing through the apparatus,
   (c) means for generating an AC field which slowly decreases to zero, and
   (d) means for identifying a magnetic recording.

4. Apparatus for carrying out the authentication process as claimed in claim 2, which comprises a successive arrangement of
   (a) means for producing a magnetic recording,
   (b) means for heating a magnetic material passing through the apparatus,
   (c) means for generating an AC field which slowly decreases to zero, and
   (d) means for identifying a magnetic recording, and an immediately adjoining further arrangement of the means (a) to (e), in the same sequence.

* * * * *